Jan. 28, 1969  E. B. HERSHBERG ET AL  3,424,329
SEALED INJECTION VIAL
Filed June 21, 1967
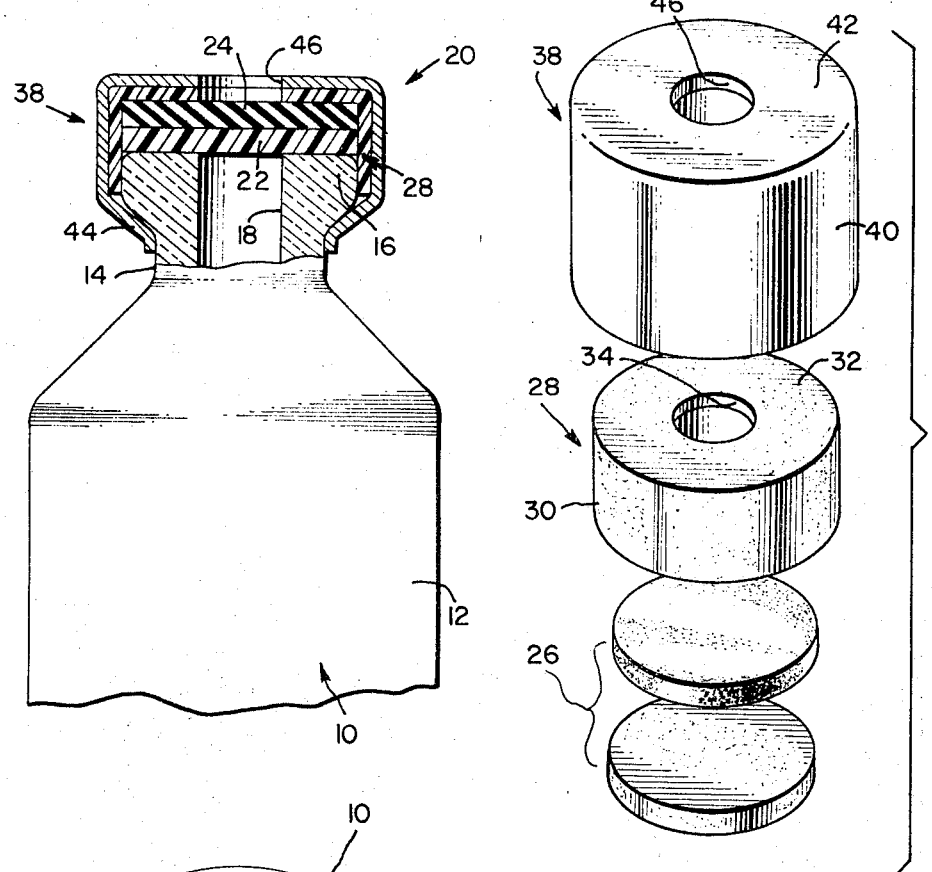
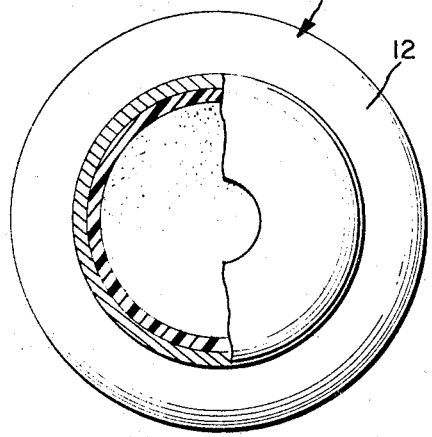
INVENTORS
EMANUEL B. HERSHBERG
HAL N. WOLKOFF
BY
ATTORNEYS United States Patent Office 3,424,329
Patented Jan. 28, 1969

3,424,329
SEALED INJECTION VIAL
Emanuel B. Hershberg, West Orange, and Hal N. Wolkoff, Bloomfield, N.J., assignors to Schering Corporation, Bloomfield, N.J., a corporation of New Jersey
Filed June 21, 1967, Ser. No. 647,677
U.S. Cl. 215—37                                      4 Claims
Int. Cl. B65d 41/20

ABSTRACT OF THE DISCLOSURE

A closure for an injection vial having an apertured nonmetallic presealing ring in addition to the conventional apertured metallic sealing ring and a composite sealing wafer consisting of a layer of generally inert plastic and a layer of rubber.

---

This invention relates to an improved sealing or closure means for a vial of a sterile injectable formulation wherein the seal is generally inert to the packaged medicament and the sealed assembly is so formed as to mitigate against contamination of the injectable formulation during the sealing operation.

A further object is to provide a seal for an injection vial that lends itself to automatic packaging systems.

One of the most commonly used sealing means for sterile injectable vials consists of a molded rubber stopper having a depending cylindrical nipple portion adapted to be received into the neck portion of the vial to be sealed. The stopper is held in sealing engagement to the neck of the vial by means of an anodized aluminum sealing ring provided with a central aperture which permits the insertion of a syringe needle through the stopper for withdrawal of all or a portion of the contents of the vial. The aperture in the sealing ring may initially be closed with a tear away member as is known in the art. In practice, the sterile vial filled with a sterile injectable is automatically passed under a hopper where a washed and sterilized stopper is inserted. The unit then passes beneath another hopper where the anodized aluminum sealing ring is added and the unit is next passed to a crimping stage where the seal is completed. While such structures have been commonly used, it has been found that it is very difficult to obtain rubber stoppers of such composition as to render the stoppers totally inert to the contents of the vial. This is particularly true in regard to the preservatives commonly added to injectable formulations and this lack of inertness has created substantial problems and has often presented an intolerable situation.

Attempts to overcome this inherent difficulty by substituting an inert plastic such as Teflon for the rubber stoppers has not proved to be satisfactory as such plastics have little elasticity requiring very high pressures to effect adequate initial sealing, most of the inert plastics such as Teflon are very difficult to mold and once such stoppers are perforated with a syringe needle the lack of elasticity prevents proper resealing of the vial.

Another common difficulty, when relatively inert plastic discs are employed, is the contamination of the injectable formulation by microscopic aluminum particles from the aluminum sealing ring. The sealing rings are generally made by punch forming from anodized aluminum sheets. In the punching operation, the edges around the aperture and at the lower end of the skirt of the sealing ring are left as exposed unanodized aluminum and such edges inherently have associated therewith microscopic bits and slivers of aluminum. It has been found that many of these tiny aluminum particles become dislodged from the aperture and lip edges and adhere with persistence to assemblies of plastic discs or stoppers and when the sealing means, together with the adhering aluminum particles are placed upon a vial the aluminum impurities inevitably are induced into the injectable formulation.

The aforementioned inherent disadvantages of the prior art forms of sealing means for injection vials are overcome by the improved sealing means of the present invention which in general may be defined as dispensing means for injectable fluids comprising a container having a neck portion defining an outlet opening, an annular lip formed about the container neck, sealing means for said outlet openings, said sealing means comprising a first disc inert to the injectable fluid adapted to engage the upper surface of said annular lip, a second resilient disc adapted to overlie said first disc, a nonmetallic presealing ring, said nonmetallic ring including a skirt portion having an inner diameter adapted to snugly receive the container lip and an apertured disc portion adapted to overlie said first and second discs, and a metallic sealing ring, said metallic sealing ring including a skirt portion having an inner diameter sized to snugly receive said nonmetallic ring and a length greater than the length of the skirt on the nonmetallic ring, and an apertured disc portion adapted to overlie the disc of said nonmetallic ring.

The invention will be more particularly described in reference to the accompanying drawing wherein:

FIG. 1 is an enlarged fragmentary partial sectional view of a vial including a preferred form of the present invention;

FIG. 2 is a fragmentary partial sectional view of the top of the structure illustrated in FIG. 1; and FIG. 3 is an exploded perspective view of the elements making up the improved sealing means illustrated in FIGS. 1 and 2.

Referring to the drawing, 10 generally designates an improved dispensing means for an injectable fluid. The dispensing means 10 includes a container 12 having a neck portion 14. The neck portion 14 tapers inwardly and then outwardly to provide a lip portion 16 for the container. The neck portion 14 is provided with a cylindrical opening 18 whereby the container 12 may be filled with an injectable formulation and through which the injectable formulation may be removed as needed.

The dispenser also includes sealing means generally designated as 20 for the container 12. The sealing means generally comprises a first disc shaped member 22. The disc shaped member 22 is constructed of a material which is generally inert to the injectable fluid adapted to be received and stored in the container. The disc shaped member 22 has a diameter such that it approximates the outer diameter of the lip portion 16 of the container neck 14 and a thickness in the order of from about 0.002" to about 0.005". The thickness of the disc 22 is not critical to the invention as long as it is thick enough to provide the necessary strength and ease of handling of the member.

Satisfactory materials of construction for the disc 22 would depend to some extent on the nature of the injectable fluid that is to be stored within the container 12. However, in general the fluorocarbon plastics possess the inert qualities desirable for the disc 22. Specifically, polyethylene, polypropylene and polytetrafluoroethylene or "Teflon" have been found to be very satisfactory.

The assembly also includes a second disc shaped member 24. The disc shaped member 24 has an outer diameter substantially the same as the first disc-like member 22 and is made from a resilient natural or synthetic elastomeric material such as rubber. Since the injectable fluid to be stored in the container 12 does not come in contact with the disc 24, the type of elastomeric material is selected primarily for its resiliency and its resealing properties. The pair of discs 22 and 24 may be separately assembled or after, for example, punching the pair of discs from their respective sheets the discs may be generally permanently assembled into a sandwich or wafer 26 by adhesively bonding the opposed surfaces of the discs or die-cutting or punching the discs from the composite sheet which is adhesively or otherwise bonded or laminated. Where an adhesive is employed to generally permanently join the pair of discs, the adhesive may be applied only to the outer portion of the opposed surfaces of the discs leaving that portion within the area of the container opening 18 unbonded.

The assembly also includes a nonmetallic presealing ring generally designated 28. The presealing ring 28 includes a skirt portion 30 and a disc-like top portion 32. The skirt portion 30 of the presealing ring 20 has an inner diameter adapted to snugly receive the container lip 16. The length of the skirt 30 of the nonmetallic presealing ring is selected such that the lower portion of the skirt engages the lip to thereby retain the pair of discs 22 and 24 on top of the lip of the container as illustrated in FIG. 1 of the drawing. The nonmetallic presealing ring may be molded or formed of any suitable plastic composition having sufficient strength to retain its formed shape under normal use and conditions. A very satisfactory sealing ring may be formed from commercial polyethylene.

The disc portion 32 of the nonmetallic presealing ring is apertured as at 34 and in the illustrated form of the invention the aperture 34 has a diameter substantially equivalent to the diameter of the opening 18 in the neck portion 14 of the container. The aperture 24 provides a zone through which a syringe needle may be inserted through the pair of sealing discs 22 and 24 when it is desired to withdraw the injectable fluid from the container.

The assembly also includes a final metallic sealing ring generally designated 38. The metallic sealing ring 38 includes a skirt portion 40 and a disc portion 42. The inside diameter of the skirt portion is sized to snugly receive therein the nonmetallic presealing ring 28. The length of the skirt 40 is such that the lower portion 44 may be crimped inwardly about the lip 16 to maintain the assembly of discs 22 and 24, the presealing nonmetallic ring 28 and the metallic sealing ring 38 on the neck portion of the container, as more clearly shown in FIG. 1 of the drawing.

The metallic sealing ring 38, also as hereinbefore set forth, includes a disc portion 42. In the illustrated form of the invention, the disc portion 42 is apertured as at 46, which aperture is positioned to correspond to the aperture 34 in the nonmetallic presealing ring and the opening 18 in the throat of the container 12. Also in the illustrated form of the invention the aperture 46 is open. Where desired, the aperture 46 may be partially perforated so that the aperture 46 is closed until the contents of the container is to be used at which time the partially perforated aperture portion can be torn away. Further, it will be appreciated by those skilled in the art that the tear away strip may extend into the skirt or side wall of the ring so that the entire aluminum sealing cap can be removed prior to use of the contents in the vial.

The preferred material for constructing the metallic ring member is aluminum and more preferably anodized aluminum.

The following procedure may be followed in carrying out the filling and sealing of injection vials constructed in accordance with the present invention:

(1) The pair of discs 22 and 24 are assembled within the nonmetallic sealing ring 28;

(2) The container 12 and the assembly consisting of the pair of discs and the nonmetallic sealing ring are washed and sterilized;

(3) The container is filled with the desired injection fluid and the washed and sterilized plastic sealing ring 28 with its assembled sealing discs 22 and 24 are placed over the lip portion of the container; and (4) At the next station the aluminum sealing ring 38 is placed over the container and crimped, as shown in the arrangement illustrated in FIG. 1.

From the foregoing description of a preferred form of the invention it will be seen that the improved injection vial sealing means fully accomplishes the aims and objects hereinbefore set forth.

We claim:

1. Dispensing means for an injectable fluid comprising a container having a neck portion defining an outlet opening, an annular lip about the container neck, sealing means for said outlet opening, said sealing means comprising a first disc inert to the injectable fluid adapted to engage the upper surface of said annular lip, a second resilient disc adapted to overlie said first disc, a nonmetallic presealing ring, said nometallic ring including a skirt portion having an inner diameter sized to snugly receive the container lip and an apertured disc portion adapted to overlie said first and second discs, and a metallic sealing ring, said metallic sealing ring including a skirt portion having an inner diameter sized to snugly receive said nonmetallic ring and a length greater than the length of the skirt on the nonmetallic ring, and an apertured disc portion adapted to overlie the disc of said nonmetallic ring.

2. The invention defined in claim 1 wherein said second disc is an elastomer, and said first disc and said non-metallic ring comprise plastic.

3. The invention defined in claim 1 wherein said second disc comprises rubber and said first disc and said nonmetallic ring comprise Teflon and said metallic ring comprises aluminum.

4. The invention defined in claim 1 wherein said second disc comprises rubber, said first disc comprises Teflon and said metallic sealing ring comprises aluminum.

References Cited

UNITED STATES PATENTS

| 1,189,465 | 7/1916 | Mayo | 215—37 |
| 3,198,368 | 8/1965 | Kirkland | 215—37 |

DONALD F. NORTON, *Primary Examiner.*